(12) United States Patent
Sukegawa et al.

(10) Patent No.: US 7,565,836 B2
(45) Date of Patent: *Jul. 28, 2009

(54) THERMAL TYPE FLOW SENSOR HAVING A SECOND CONTROL CIRCUIT TO CONTROL A SECOND HEATING RESISTOR ABOVE THE FIRST HEATING TEMPERATURE

(75) Inventors: Yoshihiro Sukegawa, Hitachi (JP);
Noboru Tokuyasu, Hitachinaka (JP);
Kaori Kashio, Hitachinaka (JP);
Daisuke Terada, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/734,432

(22) Filed: Apr. 12, 2007

(65) Prior Publication Data
US 2007/0251315 A1 Nov. 1, 2007

(30) Foreign Application Priority Data
Apr. 13, 2006 (JP) ............................ 2006-110849

(51) Int. Cl.
*G01F 1/68* (2006.01)
(52) U.S. Cl. .................................. 73/204.27; 73/204.15
(58) Field of Classification Search ............... 73/204.26, 73/204.27
See application file for complete search history.

(56) References Cited

U.S. PATENT DOCUMENTS

| 4,283,944 | A | | 8/1981 | Gruner et al. |
| 4,559,814 | A | | 12/1985 | Sato et al. |
| 4,587,842 | A | | 5/1986 | Handtmann |
| 4,829,819 | A | | 5/1989 | Lefteriou et al. |
| 4,833,912 | A | | 5/1989 | Ohta et al. |
| 5,003,822 | A | * | 4/1991 | Joshi ....................... 73/204.23 |
| 5,311,772 | A | | 5/1994 | Martinson et al. |
| 5,635,635 | A | | 6/1997 | Tsukada et al. |

FOREIGN PATENT DOCUMENTS

| DE | 40 12 081 A1 | 10/1991 |
| JP | 59-136620 | 8/1984 |

OTHER PUBLICATIONS

European Search Report dated Aug. 27, 2007 (Five (5) pages).
Chinese Office Action dated Apr. 11, 2008 w/English translation (seven (7) pages).
European Search Report issued Apr. 6, 2009.

* cited by examiner

*Primary Examiner*—Harshad Patel
(74) *Attorney, Agent, or Firm*—Crowell & Moring LLP (57) ABSTRACT

A flow rate measuring element of a thermal type flow sensor is placed in the fluid to be measured. The element includes: a first heating resistor for measuring a flow rate; a second heating resistor for heating a support for the first heating resistor; and current control circuits and which control heating resistor supply current so that the temperature of the second heating resistor is higher than the temperature of the first heating resistor.

9 Claims, 9 Drawing Sheets

EXHAUST GAS FLOW
(INCLUDING CARBON PARTICLES, ETC)

FLOW DIRECTION OF FLUID TO BE MEASURED

THERMAL TYPE FLOW SENSOR HAVING A SECOND CONTROL CIRCUIT TO CONTROL A SECOND HEATING RESISTOR ABOVE THE FIRST HEATING TEMPERATURE

CLAIM OF PRIORITY

The present application claims priority from Japanese application serial no. 2006-110849, filed on Apr. 13, 2006, the content of which is hereby incorporated by reference into this application.

BACKGROUND OF THE INVENTION

The present invention relates to a thermal type flow sensor for measuring a mass flow rate of a fluid by using a heating resistor.

A conventional typical thermal type flow sensor has two temperature-dependent heating resistors incorporated in a bridge circuit. One of these resistors is used as a heating resistor for measuring a flow rate, and designed to have a relatively small resistance value because a heating current is applied. The other resistor is used as a temperature compensating resistor for a fluid to be measured, and designed to have a larger resistance value than the heating resistor because it is used at room temperature. In such a bridge circuit, potentials at two midpoints are sent to an operational amplifier and the current which flows through the heating resistor is controlled so that even when the heat of the heating resistor is lost according to the fluid flow rate (namely, flow velocity), the temperature difference between the heating resistor and the temperature compensating resistor is maintained at a prescribed value (the difference between the potentials at the midpoints is zero).

Furthermore, as one example of the prior art, Patent Document 1 (Japanese patent publication No. S-59-136620) discloses a flow rate measuring device which does not use a temperature compensating resistor but uses two bridge circuits comprised of only a heating resistor and plural fixed resistances where the heating temperatures of the heating resistors in both the bridge circuits are set to be different from each other. In this device, difference in output related to heating currents which flow through respective heating resistors of the two bridge circuits is sent to a microcomputer (microprocessor) to calculate the flow rate.

According to this prior art, the flow rate can be measured under no influence of fluid temperature without using a temperature compensating resistor. The flow rate measuring device described in Patent Document 1 has been proposed based on the following concept. The heating resistor and the temperature compensating resistor have different thermal time constants, which exerts an unfavorable influence on the flow rate measuring accuracy; therefore, in order to eliminate such an influence, a device which uses no temperature compensating resistor is proposed.

Furthermore, Patent Document 1 proposes a technical matter of disposing a protective heater on a base (plate) for supporting the heating resistor to heat the base only. This protective heater is independent from the heating resistor for measuring a flow rate (measuring heating resistor), and it is controlled to become the same temperature T1 as the measuring heating resistor. The protective heater is used to prevent transfer of heat from the measuring heating resistor to the base and improve the response of the measuring heating resistor.

The support for supporting the flow rate-measuring heating resistor, in a case of using a hot wire as the heating resistor, is comprised of a tube made of insulating material (for example, alumina tube) for winding the hot wire.

The support is maintained at a certain temperature level by heat transfer from the heating resistor. More specifically, since the support's portion other than the heating resistor winding area is exposed to the fluid to be measured and the heat of the support is dissipated into the atmosphere of the fluid, the support is maintained at a certain temperature level lower than the heating resistor.

If the temperature level of this support is kept almost constant (in other words, the level of heat dissipation from the support to the atmosphere of the fluid to be measured is kept almost constant), the level of heat dissipation through the heating resistor support is almost constant and this heat dissipation does not unfavorably affect the flow rate measuring accuracy.

A flow rate measuring device using a heating resistor has been generally used to measure an intake air flow rate of a vehicle internal combustion engine. In recent years, it has been sometimes used in an exhaust gas atmosphere in order to measure the EGR flow rate in an EGR (exhaust gas recirculation) system of a vehicle internal combustion engine.

When the flow rate measuring heating resistor is used in an exhaust gas atmosphere, soot-based nonvolatile matter contained in the exhaust air would gradually deposit on the support for supporting the flow rate measuring heating resistor. As such soot volume increases over time, heat transmission between the support and the fluid to be measured (gas to be measured) would change from that before such deposition, the result would exert an unfavorable influence on output of the fluid flow sensor. More specifically, as the rate of heat dissipation from the support to the atmosphere of the fluid to be measured changes depending on the degree of soot deposition, the rate of heat dissipation from the flow rate measuring heating resistor to the support would also change, so that the output value of the flow rate measuring heating resistor in relation to the gas flow rate before soot deposition would be different from that after soot deposition, resulting in a measurement error.

In order to prevent this, it is effective to stop the flow of heat from the flow rate measuring heating resistor to the support thereof.

In the structure described in Patent Document 1, the protective heater (hereinafter sometimes called the "second heating resistor") is wound around the support for the flow rate measuring heating resistor (hereinafter sometimes called the "first heating resistor") to become the temperature of the second heating resistor equal to the temperature of the first heating resistor. Thereby, heat transfer from the first heating resistor to the support is prevented and the response in flow rate measurement is improved.

When the temperature of the second heating resistor is made equal to the temperature of the first heating resistor, heat transfer from the first heating resistor to the support is prevented to the some level but actually it is impossible to prevent such heat transfer completely. More specifically, since the support's portion between the first and second heating resistors is exposed to the atmosphere of the gas to be measured, there is heat dissipation from the support to the atmosphere gas. Hence, when the temperature of the second heating resistor is made equal to the temperature of the first heating resistor, the temperature of the support becomes lower than that of the first heating resistor for measuring a flow rate. As a consequence, a heat flow from the first heating resistor to the support occurs.

Even if such a heat flow occurs, when the fluid to be measured is an air passed through an air filter, there is no soot deposition on the support and the level of heat dissipation from the support to the air is kept virtually at a constant level. Consequently, it does not exert an unfavorable influence on the flow rate measurement accuracy and makes it possible to achieve a response improvement as desired.

However, even in the flow rate measuring device as described in Patent Document 1, when the flow rate measuring element (which is comprised of first and second heating resistors mounted on the support) is placed in an exhaust gas atmosphere, soot deposition on the support might change the level of heat dissipation from the support to the exhaust gas atmosphere, exerting an unfavorable influence on the flow rate measurement accuracy.

SUMMARY OF THE INVENTION

An object of the present invention is to eliminate such an unfavorable influence of pollution of the support for the heating resistor on output characteristics of a flow rate sensor (flow rate measuring device).

In order to solve the above problem, the present invention is basically structured as follows.

A thermal type flow sensor for measuring a fluid flow rate by using a heating resistor comprises a first heating resistor for measuring the fluid flow rate and a second heating resistor for heating a support for the first heating resistor, and a temperature of the second heating resistor is set to a level higher than that of the first heating resistor.

In the above structure, a minimum temperature point (point at which the temperature gradient becomes zero) can be make in the support's portions between the first and second heating resistors. Thereby the support for the first and second heating resistors can prevent heat transfer in an atmosphere of a fluid to be measured.

According to the present invention, an unfavorable influence of pollution of the support for the heating resistor on output characteristics can be eliminated.

DETAILED DESCRIPTION OF THE PREFERRED EMBODIMENTS

Next, embodiments of the present invention will be described referring to drawings.

FIG. 1(a) is a partially sectional front external view of a measuring element (sensing section) in a thermal type flow sensor according to an embodiment of the present invention and FIG. 1(b) is a longitudinal sectional view of it.

The flow rate measuring element 1 is comprised of: a cylindrical support (first support) 5 for supporting a heating resistor 7; a temperature-dependent hot wire (first heating resistor) 7 for measuring a flow rate wound around the support 5; a temperature-dependent hot wire (a second heating resistor) 10 which is to heat the support and that is wound around the support 5 similarly via sleeves (second support) 9; terminal pins 6 for the first heating resistor which are provided at both ends of the support 5; and terminal pins 12 for the second heating resistors which are provided around the respective sleeves 9.

The cylindrical support 5 and the sleeves 9 are made of an electrically insulating material with heat resistance, for example, an alumina tube (bobbin). Hereinafter, in this embodiment, the support 5 and the sleeves 9 may be referred to as alumina tubes but the material is not limited thereto. The alumina tube 5 and the terminal pins 6 are joined by a heat-resistant material, for example, heat-resistant glass. The terminal pins 6 also have the function of supporting the flow rate measuring element.

A Pt wire (platinum wire) as the first heating resistor 7 is wound around the central area of the outer surface of the alumina tube 5. A pair of sleeves (support: alumina tubes) 9 are fitted at two positions of the left and right sides of the first heating resistor 7 on the outer surface of the alumina tube 5. A second heating resistor (Pt wires) 10 for heating the support (alumina tube) 5 for the first heating resistor 7 are wound around these alumina tubes 9. Hereinafter, in this embodiment, the first heating resistor 7 and the second heating resistor 10 may be referred to as Pt wires but the material is not limited thereto and any other material may be used as far as they are temperature-dependent.

Left and right side lead wires 7' of the first heating resistor (Pt winding) 7 are passed through guide grooves 9' formed in the alumina tubes 9 and led to the respective terminal pins 6. Each end of the Pt winding 7 (one end of each of the lead wires 7') is welded to the terminal pin 6 so that the Pt winding 7 is physically and electrically connected with the terminal pin 6.

In this embodiment, the guide grooves 9' are formed, for example, in the inner surfaces of the alumina tubes 9. As far as the guide grooves 9' can be kept electrically isolated from the Pt winding 7 and Pt windings 10, they may be formed on the outer surfaces of the alumina tubes 9 or as slits. Also, although the guide grooves 9' in this embodiment are formed along a line oblique to the axial direction of the alumina tubes 9, they may be formed along a line parallel to the axial direction of the tubes. The terminal pins 6 and 12 of the first and second heating resistors are almost perpendicular to each other, thereby preventing them from interfering with each other.

Both ends 11 of the second heating resistor (Pt winding) 10 disposed on the left and right sides of the first heating resistor (Pt winding) 7 are connected to the respective terminal pins 12 for the second heating resistor by welding and thus both the ends of Pt winding 10 and the terminal pins 12 are physically and electrically connected. The Pt winding 10 is comprised a pair of winding parts on the left and right sides of the support 5, these pair winding parts are mutually connected through an intermediate connecting line 14 integral with the pair winding parts. The intermediate connecting lines 14 bridges over the first heating resistor (Pt wiring) 7 and connects with the left and right second heating resistor parts (Pt winding parts) 10. The Pt winding 7 and the Pt winding 10 are electrically isolated from each other. In addition, they are covered with glass coats 8a and 8b.

Figure 2:
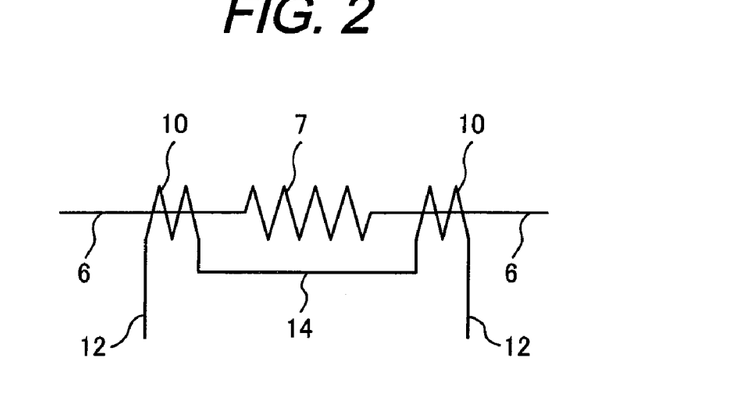
FIG. 2 schematically shows wire connections for the first and second heating resistors of the flow rate measuring element shown in FIG. 1.

The wire connections for the first and second heating resistors of the flow rate measuring element 1 structured as mentioned above are schematically shown in FIG. 2. This shows that the pair of winding parts of the second heating resistor 10 lie over the terminal pins 6 (including the support 5) of the first heating resistor 7 so that the first heating resistor 7 is placed between the pair of winding parts of the second heating resistor 10.

Figure 1:
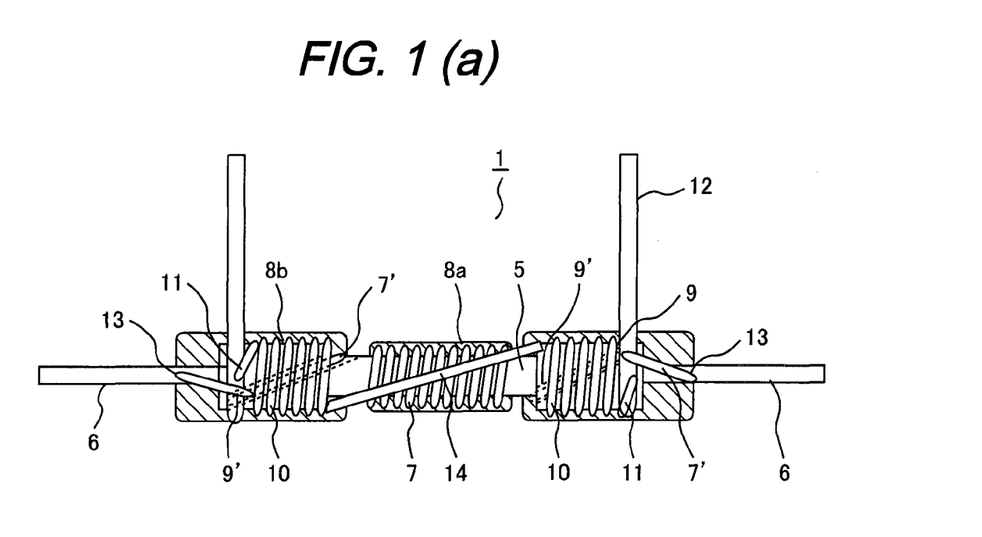
FIG. 1(a) is a partially sectional front external view of a measuring element (measurement section) in a thermal type flow sensor according to an embodiment of the present invention.
FIG. 1(b) is a longitudinal sectional view of it.

It is desirable that, as shown in FIG. 1, an air gap 50 is placed between the glass coat 8a of the first heating resistor 7 and the glass coat 8b of the pair winding parts of the second heating resistors 10 in order to prevent the following problem. That is, if the coats of the first heating resistor 7 and the second heating resistor 10 should be connected, heat transfer between the first heating resistor 7 and the second heating resistor 10 would take place due to heat conduction through the glass coats, such a phenomenon might unfavorably affect the fluid flow measurement accuracy. This problem can be resolved by the existence of the air gap 50.

Figure 3:
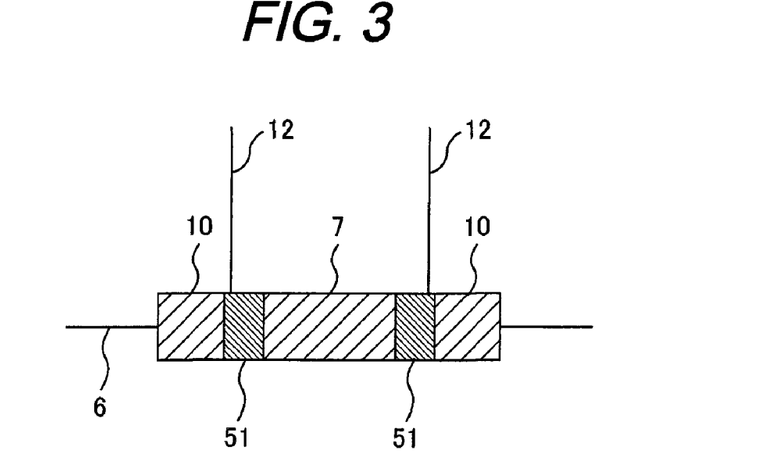
FIG. 3 is a schematic diagram showing another mode of the flow rate measuring element in the above embodiment.

As shown in FIG. 3, instead of the air gap 50, a heat insulation member 51 made of a material having a lower heat conductivity than the glass coats 8a and 8b (heat-resistant resin, heat-resistant rubber, calcium silicate or the like) may be placed between the first heating resistor 7 and the second heating resistor 10.

Figure 4:
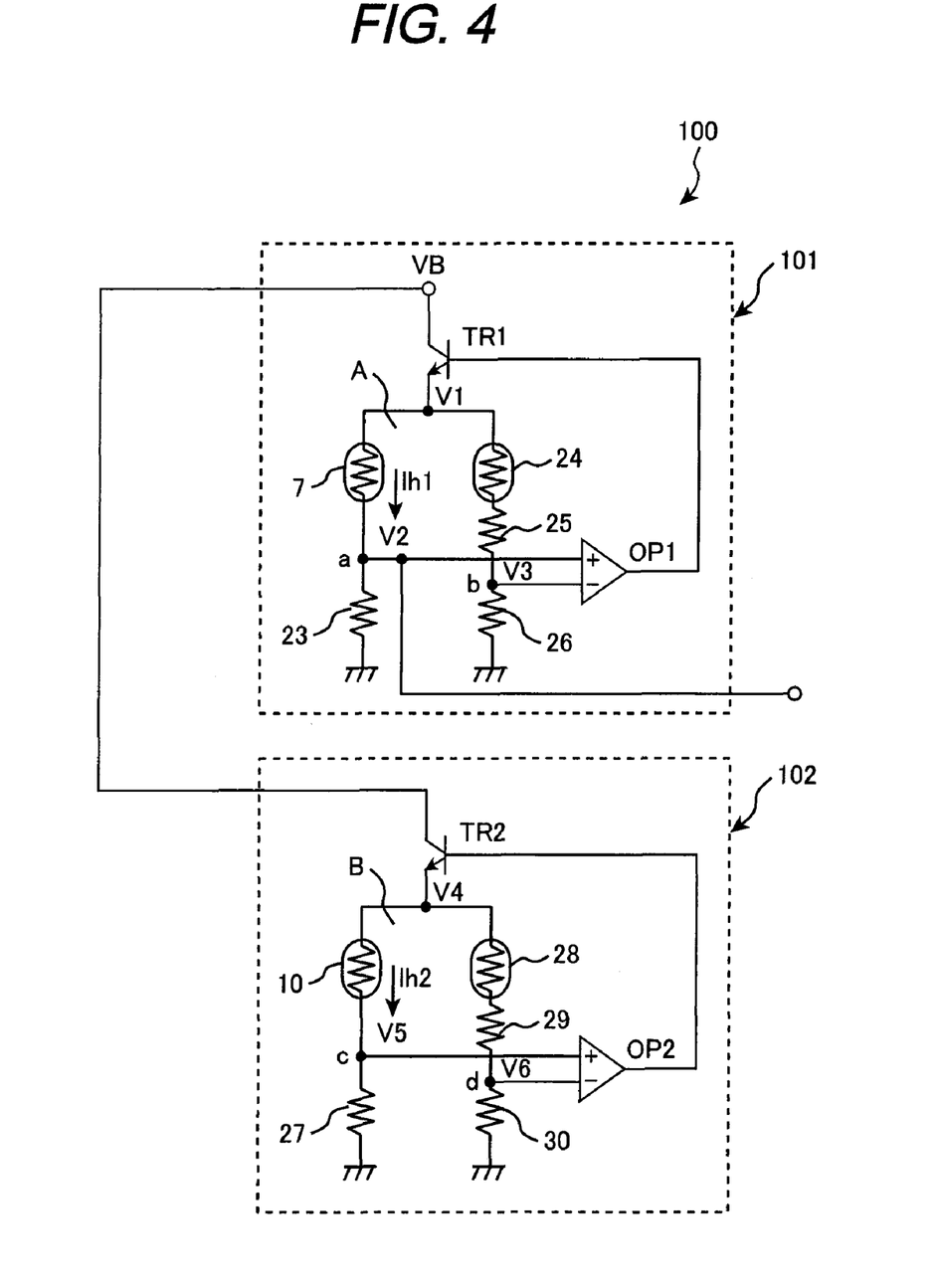
FIG. 4 shows the circuit configuration of the flow sensor according to this embodiment.

FIG. 4 shows the circuit configuration of the flow sensor according to this embodiment.

The flow sensor circuit 100 in this embodiment is mainly comprised of: a flow rate measuring circuit (main circuit) 101 which controls the heating current (heating resistor supply current) of the first heating resistor 7 for measuring a flow rate and outputs a flow rate measuring signal; and a sub circuit 102 which controls the heating current of the second heating resistor 10 for heating the support.

The flow rate measuring circuit 101 as the main circuit comprises a Wheatstone bridge circuit (A), which is configured by connecting a first branch series circuit composed of a first heating resistor 7 (resistance value Rh1) and a heating current sensing resistance 23 (resistance value R3) to a second branch series circuit composed of a temperature compensating resistor 24 (resistance value Rc1), a fixed resistance 25 and a fixed resistance 26 (resistance value R2) in parallel. The main circuit 101 further comprises an operational amplifier OP1 which takes in the potentials at midpoints a and b of the two branch series circuits of the Wheatstone bridge circuit (A) (bridge midpoint potentials), and a power transistor TR1 which controls a current to be supplied to the Wheatstone bridge circuit (A) in accordance with an output of the operational amplifier OP1.

The sub circuit 102 comprises a Wheatstone bridge circuit (B), which is configured by connecting a first branch series circuit composed of a second heating resistor 10 (resistance value Rh2) and a fixed resistance 27 (resistance value R6) to a second branch series circuit composed of a temperature compensating resistor 28 (resistance value Rc2), a fixed resistance 29 (resistance value R4) and a fixed resistance 30 (resistance value R5) in parallel. The sub circuit comprises an operational amplifier OP2 which takes in the potentials at midpoints c and d of the two branch series circuits of the Wheatstone bridge circuit (B), and a power transistor TR2 which controls the current to be supplied to the Wheatstone bridge circuit (B) in accordance with on output of the operational amplifier OP2.

Next, how the flow rate measuring circuit (main circuit) 101 and the sub circuit 102 operate will be explained. The flow rate measuring circuit 101 and the sub circuit 102 are almost equal in basic circuit configuration. However, the heating resistors 7 and 10 are set to different temperatures. In addition, while the heating current measurement value (flow rate measurement value) V2 in the former circuit is taken through the resistance 23 and sent to an external control circuit (not shown), in the latter circuit there is no such arrangement.

First, operation of the flow rate measuring circuit 101 will be explained below.

A current (voltage V1) from a power source VB is supplied to the Wheatstone bridge circuit (A) of the flow rate measuring circuit 101 through the power transistor TR1. The potentials at the midpoints a and b in the Wheatstone bridge circuit (A) are represented by V2 and V3 respectively. Also the current which flows in the first heating resistor 7 is controlled by means of the operational amplifier OP1 and the power transistor TRI so that the potentials V2 and V3 at the bridge midpoints a and b are equal.

The first heating resistor 7 has a temperature characteristic that as the temperature rises, its resistance value Rh1 increases. The resistance value Rh1 is virtually proportional to temperature Th1 of the first heating resistor 7.

The temperature Th1 is set by the temperature compensating resistor 24 so as to be higher than temperature Tg of the fluid to be measured by a given temperature ΔTh1 (Th1=Tg+ΔTh1). Here, ΔTh1 is determined so that the temperature Th1 of the first heating resistor 7 is higher than the boiling temperature of the volatile matter contained in the dust in the fluid to be measured.

The resistance value Rh1 of the first heating resistor 7 is expressed by Formula (1).

[Formula 1]

$$R_{h1} = R_{h10}(1 + a_1 T_{h1}) \tag{1}$$

Here, $Rh_{10}$ represents the resistance value of the first heating resistor 7 and $a_1$ represents a temperature coefficient.

As the flow rate (flow velocity) of the fluid passing through the first heating resistor 7 in the flow rate measuring circuit (hot-wire drive circuit) 101 increases, heat from the heating resistor 7 dissipates into the fluid flow and the temperature Th1 (resistance value $R_{h1}$) of the first heating resistor 7 goes down and the voltage V2 at bridge midpoint a rises. Then, output of the operational amplifier OP1 is increased and thus current Ih1, which is supplied to the first heating resistor 7 by the power transistor TR1, increases so that the temperature Th1 (resistance value $R_{h1}$) of the first heating resistor 7 becomes a given level.

Sine the relation expressed by Formula (2) exists between voltage V2 at bridge midpoint a and the mass flow rate Q of the fluid to be measured, the flow rate Q of the fluid to be measured is calculated in accordance with Formula (2).

[Formula 2]

$$V_2 = R_1 I_{h1} = R_1 \sqrt{\frac{1}{R_{h1}}(A + B\sqrt{Q})\Delta T_{h1}} \qquad (2)$$

In Formula (2), A and B represent constants.

Next, operation of the sub circuit 102 will be explained.

A current (voltage V4) from the power source VB is supplied to the Wheatstone bridge circuit (B) of the sub heater temperature control circuit 102 through the power transistor TR2. The potentials at the midpoints c and d in the Wheatstone bridge circuit (B) are represented by V5 and V6 respectively. Also the current which flows through the second heating resistor 10 is controlled by means of the operational amplifier OP2 and the power transistor TR2 so that the potentials V5 and V6 at the bridge midpoints c and d are equal.

The second heating resistor 10 has a temperature characteristic that as the temperature rises, its resistance value Rh2 increases. The resistance value Rh2 is proportional to temperature Th2 of the second heating resistor 10.

The temperature Th2 is set by the temperature compensating resistor 28 so as to be higher than temperature Tg of the fluid to be measured by a given temperature ΔTh2 (Th2=Tg+ΔTh2). Here, ΔTh2 is made larger than ΔTh1 for the first heating resistor 7 in the flow rate measuring circuit 101. For example, if ΔTh1=100° C., ΔTh2=150° C. In addition to the above temperature setting, the sub circuit 102 for heating the support basically uses a bridge circuit, an operational amplifier and a power transistor which are similar to those in the flow rate measuring circuit 101, so the temperature Th2 of the second heating resistor 10 is always higher than the temperature Th1 of the first heating resistor 7 regardless of any change in the flow rate or the temperature of the fluid to be measured.

Figure 5:
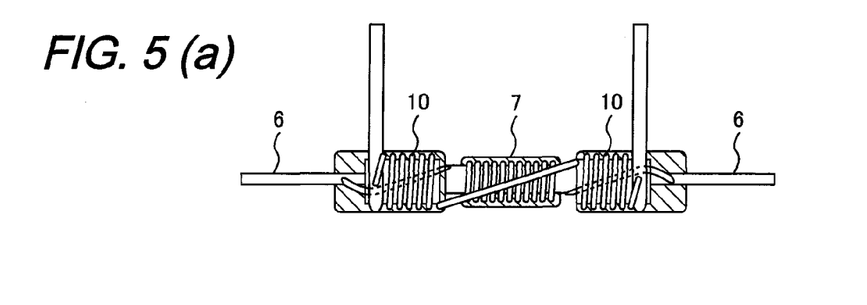
FIG. 5 shows, in a case of the flow rate measuring element of the flow sensor according to this embodiment being placed in the fluid to be measured, a temperature distribution and a heat flux distribution in the axial direction of the element.

FIG. 5 shows a temperature distribution and a heat flux distribution in the axial direction of the element 1 when the flow rate measuring element 1 of the flow sensor according to this embodiment is placed in the fluid to be measured.

As mentioned above, the first heating resistor 7 is set to a temperature higher than the fluid temperature by ΔTh1 and the second heating resistor 10 is set to a temperature higher than the fluid temperature by ΔTh2. This means that the second heating resistor 10 is set to a temperature higher than the first heating resistor 7 by ΔTh2−ΔTh1.

The Areas between the first heating resistor 7 and the pair of winding parts of the second heating resistor 10 almost make no heat with windings, and heat dissipation from the support 5 for the flow rate measuring element 1 to the fluid to be measured occurs in these areas. Hence, as illustrated in FIG. 5(b), the temperature of areas just outside of the left and right ends of the first heating resistor 7 become lower than the temperature Th1 of the first heating resistor 7. In areas further outside of its left and right ends, since heat is generated by the second heating resistors 10, the temperature rises to a level higher than the temperature Th1 of the first heating resistor 7. Thus, two minimum temperature points F0 exist between the first heating resistor 7 and the pair of winding parts of the second heating resistor 10 as illustrated in FIG. 5(b). FIG. 5(c) shows gradients (derivative values) of heat flux distribution for FIG. 5(b). At the minimum points F0, the temperature gradients are zero and thus the heat flux which flows in the flow rate measuring element 1 becomes zero.

In this embodiment, the flow rate measuring circuit (main heater control circuit) 101 and the sub circuit 102 both use bridge circuits. In the prior art described earlier (JP-A No. S59-136620) as well, a flow sensor uses two bridge circuits and the heating resistors in both the bridge circuits are set so as to have different heating temperatures. However, its application and circuit configuration are different from this embodiment as described below.

More specifically, in the above prior art, the flow rate is calculated by sending output difference between the heating currents flowing in the heating resistors (first heating resistor and second heating resistor) in the two bridge circuits to the microprocessor as mentioned earlier. In this prior art, this structure makes it possible to measure a flow rate without an influence of the fluid temperature even when a temperature compensating resistor is not used. In other words, the two bridge circuits proposed by the above prior art are both intended to measure a flow rate but not to heat the support as in this embodiment. In this prior art, a third heating resistor (protective heater) is provided on a cylindrical support (base) around which the heating resistors (first heating resistor and second heating resistor) are wound. Nothing about the circuit configuration of this third heating resistor (protective heater) is disclosed. Although this third heating resistor heats its support (cylindrical base) like the second heating resistor in the present invention, the prior art is different from the present invention in that the third heating resistor is set to the same temperature as the first heating resistor and the second heating resistor. In this temperature setting condition, the area around the third heating resistor has a better condition for heat dissipation through the support than the first heating resistor and the second heating resistor and it is thus difficult to make a minimum point on the support.

Figure 9:
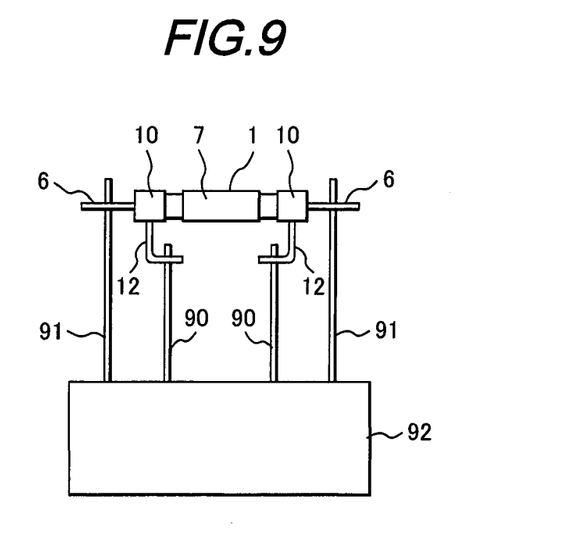
FIG. 9 shows the general structure of the flow sensor in the above embodiment.

FIG. 9 shows the general structure of the flow sensor in this embodiment.

A control module 92 comprises circuit elements (those shown in FIG. 4, or FIG. 10 which will be explained later) except the heating resistors and temperature compensating resistor in the flow sensor circuit configuration. The terminal pins 6 of the first heating resistor 7 are welded to conductive supporting pins 91 of the control module 62. Also, the terminal pins 12 of the flow rate measuring element 1 are welded to supporting pins 90. In a broad sense, the supporting pins 90 and 91 also constitute the support for the flow rate measuring element 1 or the flow rate measuring element like the alumina tube 5 and terminal pins wires 6 as mentioned earlier. In this embodiment, the existence of minimum points on the alumina tube makes it possible that the heat flux from the flow rate measuring heating resistor 7 to the terminal pins 6 and supporting pins 90 is virtually zero.

Figure 6:
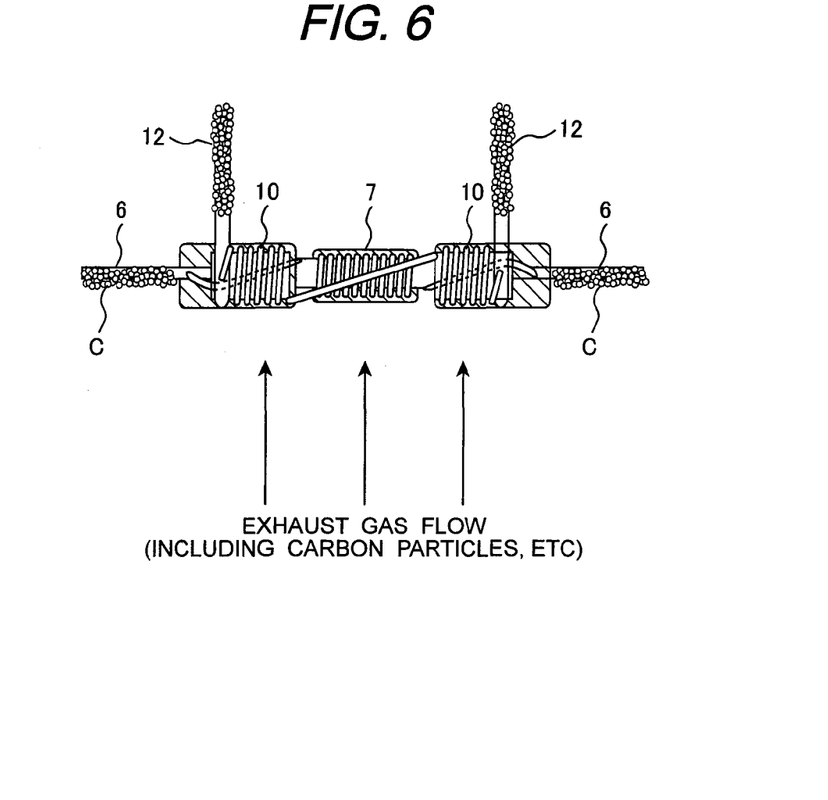
FIG. 6 shows a condition of pollution in case that the flow rate measuring element used in this embodiment is placed in an engine exhaust gas.

FIG. 6 shows the flow rate measuring element used in this embodiment which is placed in an engine exhaust gas. Generally an engine exhaust gas contains carbon particles and oil mist generated by combustion inside engine cylinders. Carbon particles are very fine particles with diameters of several nanometers or microns and known to contain volatile fractions such as SOF (flammable organic fraction) or HC (hydro carbon). Since these volatile fractions are tacky, carbon particles in an exhaust gas easily adhere to a solid wall and deposit thereon. If the temperature of the wall surface against which carbon particles collide is much higher than the boiling temperature of the volatile fractions, after collision of carbon particles against the wall surface the volatile fractions boil and evaporate quickly and thus the carbon particles' adhesive force is lost and the carbon is carried away by the gas flow without staying at the place of its collision. Therefore, if the flow rate measuring element 1 according to this embodiment is placed in an exhaust gas, carbon particles do not deposit on the heating resistors because the first heating resistor 7 and the second heating resistors 10 are set to temperatures higher than the boiling temperature of volatile fractions contained in the carbon particles such as SOF and HC. On the other hand, the terminal pins 6 and 12 dissipate their heat into the exhaust gas and their temperature becomes lower than the boiling temperature of volatile fractions contained in the carbon particles such as SOF and HC; and due to the adhesive force of these volatile fractions, carbon particles C deposit on the terminal pins 6 and 12. Since the carbon particles which have deposited on the terminal pins work as heat resistance between the terminal pins and the gas to be measured, the larger the thickness of carbon deposition is, the more difficult it is for the terminal pins to dissipate heat into the gas to be measured.

Hence, the amount of heat dissipated from the heating resistor 7 into the gas through the terminal pins 6 varies depending on the thickness of carbon particle deposition on the terminal pins 6, such a deposition might cause a flow rate detection error.

However, in this embodiment, heat dissipation from the first heating resistor 7 to the terminal pins 6 and 12 is made virtually zero by setting a minimum point where the heat flux is zero, in the portion of the support 5 between the first heating resistor 7 and the second heating resistor 10. As a consequence, the first heating resistor 7 is thermally isolated from the terminal pins 6 and 12. So even if carbon deposits on the terminal pins 6 and 12 and the heat resistance between the terminal pins and the gas changes, this exerts no influence on gas flow rate measurement by the first heating resistor 7.

Figure 7:
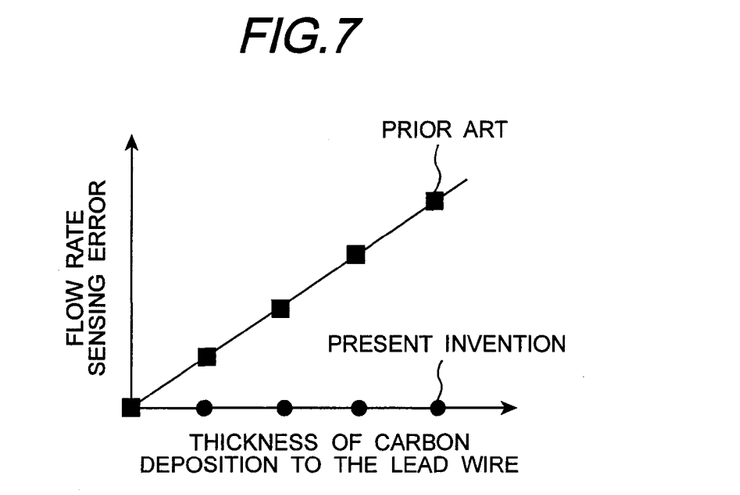
FIG. 7 shows change in flow rate measurement error with respect to the thickness of carbon deposition to the terminal pin of a heating resistor.

FIG. 7 shows change over time in flow rate measurement error with respect to the thickness of carbon deposition to the terminal pins of the first heating resistor 7. When no second heating resistor is provided or a second heating resistor is provided but its preset temperature is equal to, or lower than, the temperature of the first heating resistor 7 (prior art), flow rate measurement error becomes larger as the thickness of carbon deposition to the terminal pins increases. Because, that's because there is existence of a heat flow from the first heating resistor 7 for measuring a flow rate to the terminal pins. On the other hand, in this embodiment, since the terminal pins are thermally isolated from the heating resistor for sensing a flow rate as mentioned above, increase in the thickness of carbon deposition to the lead wire exerts no influence on flow rate measurement and does not lead to a larger error.

Figure 8:
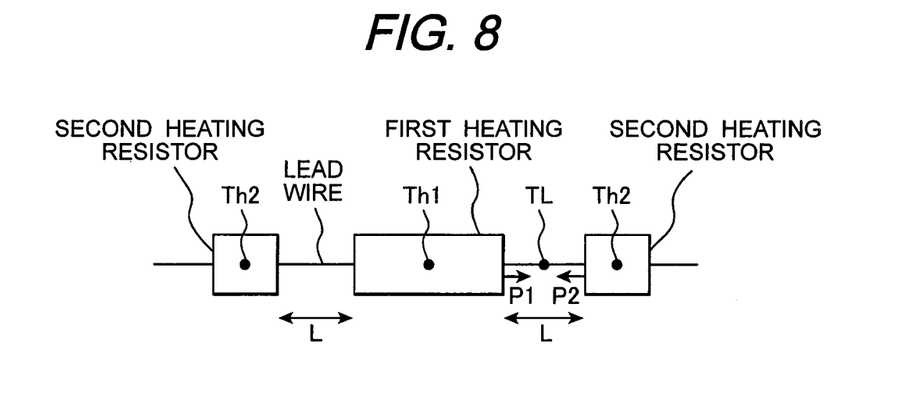
FIG. 8 shows a thermal analysis model of the thermal type flow sensor in this embodiment.

Next, the present invention will be explained based on theoretical analysis from the viewpoint of heat balance. FIG. 8 shows a thermal analysis model of a thermal type flow sensor according to the present invention. This thermal analysis model is comprised of a first heating resistor for measuring the flow rate of a fluid to be measured and its terminal pins and a pair winding parts of a second heating resistor disposed around the terminal pins. Assuming that the temperature of the first heating resistor is constant, the temperature thereof is represented by Th1. Similarly, assuming that the temperature of the second heating resistors is constant, the temperature of thereof is represented by Th2. The length of the lead wire between the first heating resistor and the second heating resistor is represented by L and the temperature at the center of each terminal pin is defined as its representative temperature TL. Also the temperature of the fluid to be measured is assumed to be constant and the temperature thereof is represented by TG.

When the thermal model as shown in FIG. 8 is used, heat transfer by heat conduction from the first heating resistor to the terminal pins is expressed by Formula (3) in accordance with Fourier's law.

[Formula 3]

$$P_1 = \lambda S_L \frac{dT}{dx} \cong 2\lambda S_L \frac{T_{h1} - T_L}{L} \quad (3)$$

In Formula (3), P1 represents the amount of heat transfer from the first heating resistor to the terminal pins; Th1 represents the temperature of the first heating resistor; TL represents the temperature of the terminal pins; L the distance between the first heating resistor and the second heating resistor; SL represents the sectional area of the lead wire; and λ represents the coefficient of heat conductivity.

Similarly, the amount of heat transfer from the second heating resistor to the terminal pins is expressed by Formula (4).

[Formula 4]

$$P_2 = \lambda S_L \frac{dT}{dx} \cong 2\lambda S_L \frac{T_{h2} - T_L}{L} \quad (4)$$

In Formula (4), P2 represents the amount of heat transfer from the second heating resistor to the terminal pins; and Th2 represents the temperature of the second heating resistor.

The amount of heat dissipation from the terminal pins to the fluid to be measured is expressed by Formula (5) using the temperature difference between each terminal pin and the fluid and the coefficient of heat conductivity on a surface of the terminal pin surface.

[Formula 5]

$$P_L = S_a h (T_L - T_G) \quad (5)$$

In Formula (5), PL represents the amount of heat dissipation from the terminal pins to the fluid; Sa represents the surface area of the terminal pins; h the coefficient of heat conductivity between each terminal pin and the fluid; and TG the temperature of the fluid.

In the steady state, since the amount of heat transfer from the first heating resistor and the second heating resistor to the terminal pins is equal to the amount of heat dissipation from the terminal pins to the fluid, the thermal balance equation as indicated by Formula (6) holds.

[Formula 6]

$$P_L = P_1 + P_2 \quad (6)$$

If the amount of heat transfer between the first heating resistor and the terminal pins is zero, the first heating resistor and the terminal pins are thermally isolated and change in the thermal condition of the terminal pins exerts no influence on the first heating resistor. In other words, even if carbon or the like deposits on the surface of the terminal pins and the amount of heat transfer between each terminal pin and the fluid varies, this does not exert an influence on the flow rate measured by the first heating resistor. As apparent from Formula (3), the condition under which the amount of heat transfer between the first heating resistor and the terminal pins is zero is expressed by Formula (7).

[Formula (7)]

$$T_{h1} = T_L \quad (7)$$

The temperature of the second heating resistor which makes the amount of heat transfer from the first heating resistor to the terminal pins zero is expressed by Formula (8):

[Formula 8]

$$T_{h2} = \frac{LS_a}{2S_L}\frac{h}{\lambda}(T_{h1} - T_G) + T_{h1} \tag{8}$$

Here, in order to ensure that the temperature Th1 of the first heating resistor is always higher than the fluid temperature TG, the first term on the right-hand side of Formula (8) is a positive value. Therefore, it is demonstrated that in order to make the amount of heat transfer from the first heating resistor to the terminal pins zero, the temperature Th2 of the second heating resistor must always be higher than the temperature Th1 of the first heating resistor.

As mentioned above, the temperature of the second heating resistor which makes the amount of heat transfer from the first heating resistor to the terminal pins zero is expressed by Formula (8), and a flow rate error due to pollution of the terminal pins can be minimized by setting the second heating resistor to such a temperature of Formula (8). However, in the present invention, the preset temperature of the second heating resistor need not always be a temperature calculated in accordance with Formula (8) but the preset temperature of the second heating resistor may be somewhere within a certain temperature range depending on the required accuracy of the flow sensor.

Figure 12:
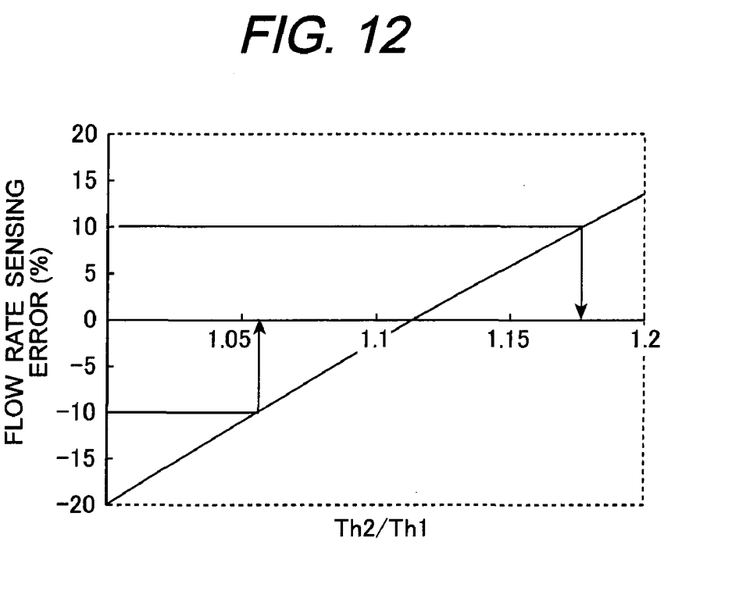
FIG. 12 shows the result of theoretical calculation of flow rate measurement error caused by pollution of the lead wire of the first heating resistor with respect to the temperature ratio between the first heating resistor and the second heating resistor.

FIG. 12 shows the result of theoretical calculation of flow rate measurement error caused by pollution of the terminal pins of the first heating resistor with respect to the temperature ratio between the first heating resistor and the second heating resistor. This calculation assumes a typical vehicle EGR gas flow sensor in which the diameter of the first heating resistor is 0.5 mm, its length 2 mm, the length of each terminal pin of the first heating resistor 1 mm, its diameter 0.15 mm, the gas flow rate 100 kg/h and the gas temperature 200° C. As far as the engine EGR gas measurement accuracy is concerned, generally the required accuracy should be within the range of ±10% in error or so. FIG. 12 suggests that in order to ensure that the accuracy is within the range of ±10% in error, the temperature of the second heating resistor should be 1.05-1.17 times higher than the temperature of the first heating resistor.

Formula (8) indicates that the temperature Th2 of the second heating resistor which makes the amount of heat transfer from the first heating resistor to the lead wire zero is proportional to the coefficient of heat conductivity between the terminal pin and the fluid h. Here, the coefficient of heat conductivity h is expressed as a function of the fluid's mass flow rate Q by Formula (9).

[Formula 9]

$$H = \lambda_g (0.24 + 0.56 Re^{0.45})/D_L \tag{9}$$

$$Re = QD_L/\mu_g$$

In Formula (9), $\lambda g$ represents the coefficient of heat conductivity of the fluid; $\mu g$ represents the coefficient of viscosity of the fluid; Re represents Reynolds number; Q the fluid's mass flow rate; and DL represents the diameter of the lead wire.

Figure 10:
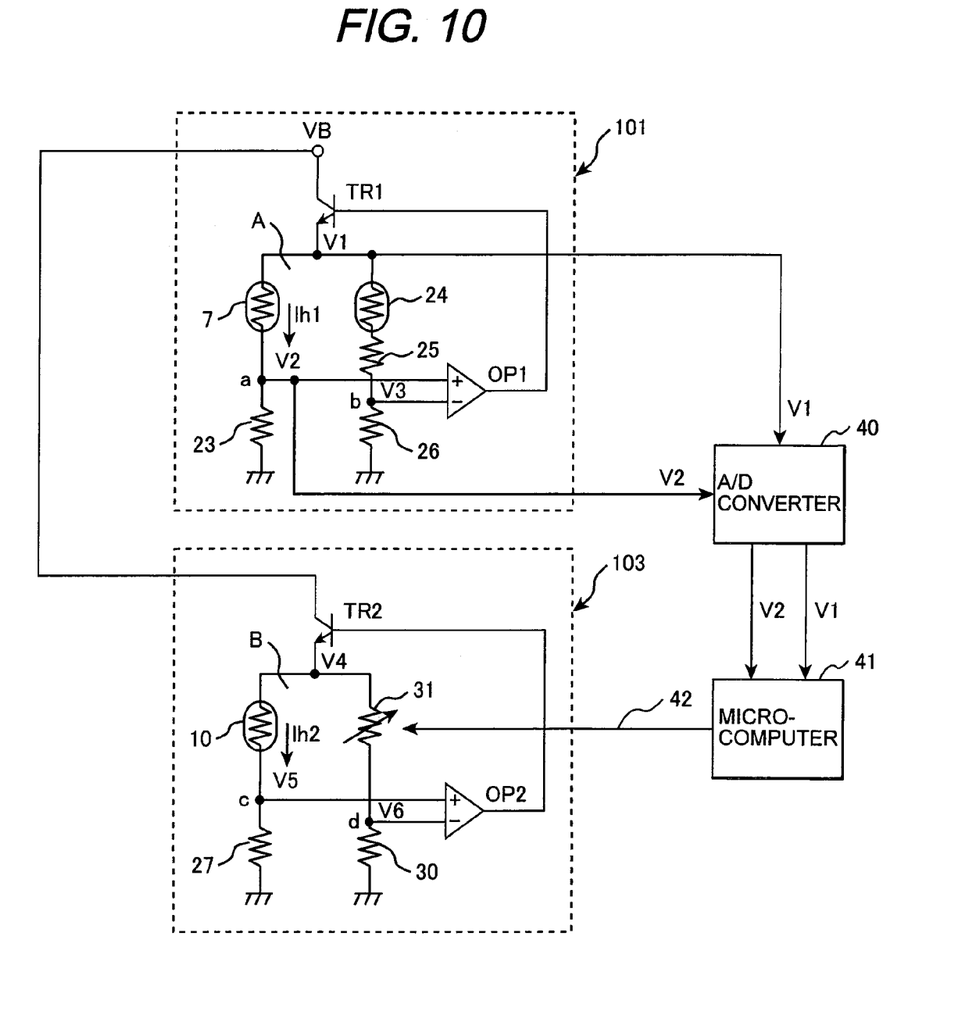
FIG. 10 shows the circuit of a flow sensor according to another embodiment of the present invention.

Therefore, as for the temperature Th2 of the second heating resistor which makes the amount of heat transfer from the first heating resistor to the terminal pins zero, the preset temperature of the second heating resistor is dependent on fluid flow rate Q. It is thus desirable that the temperature of the second heating resistor be changed in relation to the flow rate or flow velocity of the fluid to be measured. Taking the above points into consideration, in a second embodiment, the temperature of the second heating resistor is controlled depending on the detected flow rate (or flow velocity). FIG. 10 shows the circuit of a flow sensor according to the second embodiment.

In FIG. 10, a reference numeral 101 represents a flow rate measuring circuit (main circuit, a hot wire drive circuit) where the circuit configuration and operation are the same as in the first embodiment. A reference numeral 103 represents a sub circuit and its difference from the sub circuit 102 in the first embodiment is that the temperature measuring resistor (temperature compensating resistor) 28 is replaced by a variable resistor 31 (resistance value Rv2).

The resistance value Rv2 of the variable resistor 31 can freely be changed according to an external control signal. The potential (voltage V1) of the first heating resistor 7 and the potential (voltage V2) of the flow rate sensing resistor 23 in the flow rate measuring circuit 101 are converted into digital data by an A/D converter 40 and the digital data is took in a microcomputer 41. The microcomputer 41 calculates the preset resistance value Rv2 of the variable resistor 31 in the sub circuit 103 using these voltage values V1 and V2 and outputs a command signal 42 to the variable resistor 31 so that the variable resistor 31 becomes the preset resistance value Rv2.

Next, how the variable resistance value Rv2 is determined in the microcomputer 41 will be explained.

In accordance with Formula (10), the microcomputer 41 calculates the resistance value Rh1 of the first heating resistor 7 using a voltage value V1 of the first heating resistor 7, a voltage value V2 of the flow rate sensing resistor 23 and a resistance value R3 of the flow rate sensing resistor 23 which have been sent from the A/D converter 40.

[Formula 10]

$$Rh1 = (V_1 - V_2) R_3 / V_2 \tag{10}$$

Since generally a linear relation as expressed by Formula (1) exists between resistor R and resistor temperature T, when resistance value Rh1 is known, the temperature Th1 of the first heating resistor can be calculated in accordance with Formula (1).

Then, the flow rate Q of the fluid can be calculated from the voltage V2 of the flow rate sensing resistor 23 in accordance with Formula (2).

Once the flow rate Q has been calculated, the coefficient of heat conductivity h between the terminal wire and the fluid is calculated in accordance with Formula (9). Furthermore, using the first heating resistor's temperature Th1 and the coefficient of heat conductivity h which have been already calculated, the preset temperature Th2 of the second heating resistor Rh2 can be calculated in accordance with Formula (8).

Once the second heating resistor's temperature Th2 has been calculated, the resistance value Rh2 of the second heating resistor can be calculated in accordance with Formula (11) and thus the resistance value Rv2 of the variable resistor 31 can be calculated in accordance with Formula (12) for balancing the bridge in the sub circuit 103.

[Formula 11]

$$R_{h2} = R_{h20}(1 + a_2 T_{h2}) \tag{11}$$

In Formula (11), Rh20 represents the resistance value of the second heating resistor and a2 represents temperature coefficient.

[Formula 12]

$$Rv_2 R_6 = Rh_2 R_5 \tag{12}$$

According to this embodiment, the temperature Th2 of the second heating resistor 10 is determined depending on the flow rate and temperature of the fluid to be measured. Incidentally, so if the flow rate of the fluid is very large, or the temperature of the fluid is very high, the preset temperature of the heating resistor may be higher than the maximum temperature which the sensor can withstand. Therefore, in order to prevent the sensor from overheating, it is desirable to include a process in which if the second heating resistor 10's temperature Th2 as calculated by the microcomputer 41 in accordance with Formula (8) exceeds a prescribed temperature, Th2 is set to a level lower than the prescribed temperature.

According to the above embodiments, heat transfer from the first heating resistor for measuring a fluid flow rate to the terminal pins thereof can be eliminated and thus even if the terminal lead wire is polluted by carbon dust deposition, flow rate measurement errors hardly occur. For this reason, particularly the thermal type flow sensor in this embodiment can measure the flow rate of a fluid containing a lot of pollutant, with high reliability.

Figure 11:
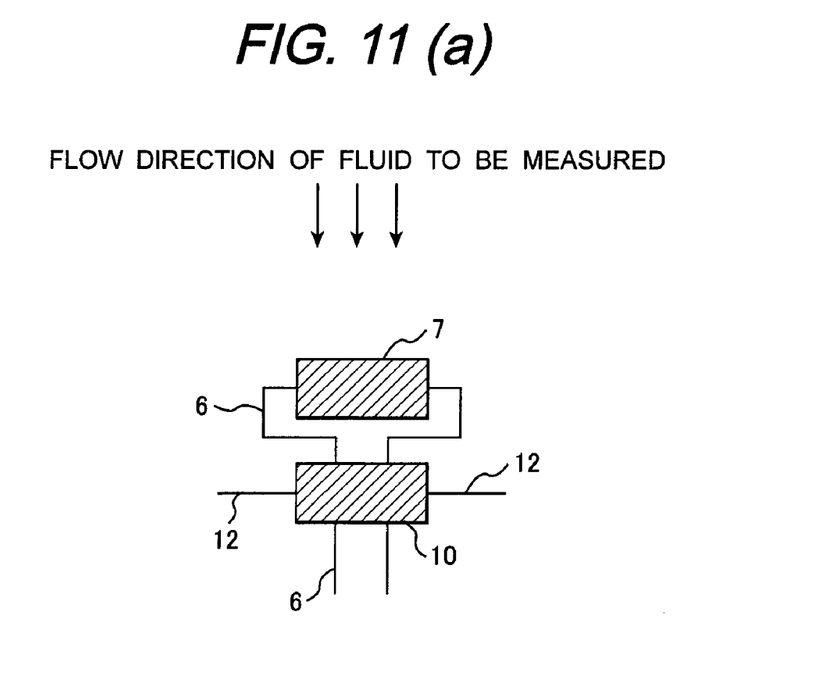
FIG. 11 is a schematic diagram showing another mode of the flow rate measuring element in the above embodiment.

In the above embodiments, the first heating resistor and the second heating resistor are formed on a common support (alumina tube); however, the present invention is not limited thereto. For example, another embodiment is possible in which as shown in FIG. 11(*a*) the support (alumina tube) is separated into two pieces and the first heating resistor 7 and the second heating resistor 10 are separately formed on the alumina tube pieces and as shown in FIG. 11(*b*). The terminal pins 6 of the first heating resistor 7 are disposed so as to be also in contact with the second heating resistor 10. In this case, preferably the second heating resistor 10 should not be located upstream of the first heating resistor 7 in the flow direction of the fluid to be measured. This is because if the second heating resistor 10 should be located upstream of the first heating resistor 7, the fluid heated by the second heating resistor 10 would reach the first heating resistor 7 for measuring a flow rate, thereby deteriorating the flow rate measurement accuracy.

Figure 13:
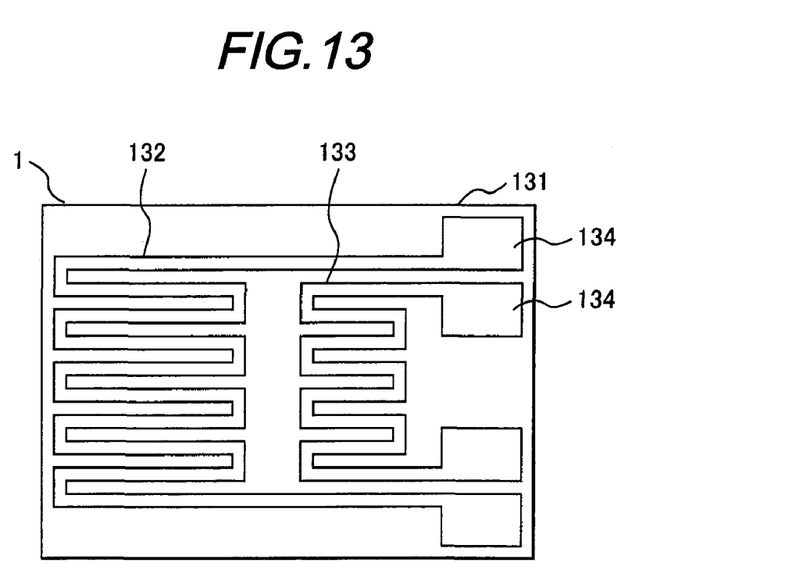
FIG. 13 is a plan view of another mode of the flow rate measuring element according to the present invention.

The above embodiments illustrate hot wire type flow sensors; however the present invention is not limited thereto and may be applied to a flow sensor with heating resistors other than hot wire on an insulating substrate. FIG. 13 is a plan view of a flow rate measuring element as such an example.

In this example, a first heating resistor for measuring a flow rate 132 and a second heating resistor for heating a base 133 are formed on an insulating substrate 131 equivalent to the substrate by pattern printing. The first heating resistor 132 and the second heating resistor 133 correspond to the first heating resistor 7 and the second heating resistor 10 in the above embodiments, respectively. Electrodes 134 for the heating resistors are formed on one side of the insulating substrate 131. The second heating resistor 133 is formed between the area of the electrodes 134 and the area of the first heating resistor 132. The heating resistors are made of, for example, nickel film, platinum film, tungsten film, nichrome film or the like. For example, alumina is used for the substrate 131.

The circuit of the flow sensor in this embodiment is the same as in the foregoing embodiments.

This embodiment is also designed so that the heating temperature of the second heating resistor 133 is set to a level higher than that of the first heating resistor 132 and a minimum point exists on the substrate 131 between the first heating resistor 132 and the second heating resistor 133. This suppresses heat flow from the substrate 131 to a member holding it (not shown), making it possible to provide a flow sensor in which flow rate measurement errors hardly occur even when carbon dust deposits on the substrate holding member or the like and pollutes it.

What is claimed is:

1. A thermal type flow sensor for measuring a fluid flow rate by using a heating resistor, comprising:
    a first heating resistor unit for measuring the fluid flow rate;
    a first current control circuit for controlling a current flowing through said first heating resistor unit in accordance with the fluid flow rate to measure the fluid flow based on said current flowing through said first heating resistor unit;
    a second heating resistor unit disposed on both sides of said first heating resistor unit to heat a support for said first heating resistor unit; and
    a second current control circuit for controlling a current flowing through said second heating resistor unit so that a temperature of said second heating resistor unit is higher than that of said first heating resistor unit.

2. The thermal type flow sensor according to claim 1, wherein said second current control circuit changes the temperature of said second heating resistor unit in relation to a flow rate or a flow velocity of said fluid to be measured.

3. The thermal type flow sensor according to claim 1, wherein said second current control circuit makes a temperature restriction so that said second heating resistor unit temperature does not exceed a preset temperature.

4. The thermal type flow sensor according to claim 1, wherein said first heating resistor and unit said second heating resistor unit are wound around a cylindrical support and are covered with respective protective coats; an air gap or a member, whose heat conductivity is lower than that of said coats, is placed between said first heating resistor unit's protective coat and said second heating resistor unit's protective coat.

5. The thermal type flow sensor according to claim 1, wherein said second heating resistor unit is located in a place other than upstream of said first heating resistor unit in a flow of a fluid to be measured.

6. The thermal type flow sensor according to claim 1, wherein the specified temperature of said second heating resistor unit is 1.05-1.17 times higher than that of said first heating resistor unit.

7. A thermal type flow sensor for measuring a fluid flow rate by using a heating resistor, comprising:
    a first heating resistor for measuring the fluid flow rate;
    a first current control circuit for controlling a current flowing through said first heating resistor in accordance with the fluid flow rate to measure the fluid flow based on said current flowing through said first heating resistor;
    second heating resistors which are disposed on both sides of said first heating resistor to heat a support for said first heating resistor; and
    a current control circuit for controlling a current flowing through said second heating resistors so that a temperature of said second heating resistors is higher than that of said first heating resistor and the temperature of said second heating resistors is changed in relation to the flow rate or a flow velocity of said fluid to be measured.

8. A thermal type flow sensor for measuring a fluid flow rate by using a heating resistor, comprising:
    a first heating resistor unit for measuring the fluid flow rate;
    a first current control circuit for controlling a current flowing through said first heating resistor unit in accordance with the fluid flow rate to measure the fluid flow based on said current flowing through said first heating resistor unit;

a second heating resistor whose divided resistor elements are disposed on both sides of said first heating resistor to heat a support for said first heating resistor; and a second current control circuit for controlling a current flowing through said divided resistors so that the temperature of said support becomes a minimum point at positions on both sides of said support portions of said first heating resistor.

9. A thermal type flow sensor for measuring a fluid flow rate by using a heating resistor, comprising:

a first heating resistor for measuring the fluid flow rate;

a first support for supporting said first heating resistor;

a second heating resistor for heating said first support; and a second support for supporting said second heating resistors, wherein said first and second heating resistors are made of hot wires respectively and said first heating resistor is wound around an outer surface of a central area of said first support;

wherein said second support is comprised of a pair of sleeves which are fitted and fixed to an outer surface of said first support so as to be disposed on both sides of said first heating resistor, and a pair of winding parts as said second heating resistor are wound around said sleeves as said second support and an intermediate line as a bridge for connecting between this pair of winding parts crosses said first heating resistor; and wherein lead wires on both sides of said first heating resistor are connected to terminal pins provided on both sides of said first support respectively by passing said lead wires through grooves or slits formed in said second support.

* * * * *